United States Patent [19]

Schwartz et al.

[11] 4,447,464

[45] May 8, 1984

[54] METHOD OF PROCESSING MARGARINE OR BUTTER FOR SQUEEZE PACKET CONTAINERS

[75] Inventors: Charles A. Schwartz, Highland Heights; Kenyon L. Cornwell, Lakewood, both of Ohio

[73] Assignee: Sar-A-Lee, Inc., Cleveland, Ohio

[21] Appl. No.: 451,075

[22] Filed: Dec. 20, 1982

Related U.S. Application Data

[63] Continuation-in-part of Ser. No. 423,063, Sep. 24, 1982, abandoned.

[51] Int. Cl.³ .................. A23C 15/00; A23D 3/02
[52] U.S. Cl. .................................. 426/663; 53/440; 426/581; 426/603; 426/664; 426/410; 426/414
[58] Field of Search .............. 426/663, 664, 603, 604, 426/581, 515, 519, 130, 414, 582, 413, 410; 53/440; 99/453

[56] References Cited

U.S. PATENT DOCUMENTS

| | | |
|---|---|---|
| 373,618 | 11/1887 | Skiff . |
| 2,563,278 | 8/1951 | Rummel et al. . |
| 2,576,834 | 11/1951 | Hensgen . |
| 2,592,224 | 4/1952 | Wilson et al. .................. 426/603 |
| 2,600,216 | 6/1952 | Denison . |
| 2,729,563 | 1/1956 | DeGoede ...................... 426/664 |
| 2,797,164 | 6/1957 | McGowan et al. ............ 426/603 |
| 2,973,269 | 2/1961 | Melnick ........................ 426/603 |
| 3,033,689 | 5/1962 | Elwood et al. ................ 426/633 |
| 3,292,258 | 12/1966 | Peters et al. . |
| 3,360,377 | 12/1967 | Spitzer et al. ................. 426/604 |
| 3,453,661 | 7/1969 | Repko . |
| 3,477,196 | 11/1969 | Lerner . |
| 3,542,570 | 11/1970 | Bush et al. .................... 426/414 |
| 3,725,086 | 4/1973 | Horner . |
| 3,798,335 | 3/1974 | Peters .......................... 426/414 |
| 3,993,580 | 11/1976 | Galusky ....................... 426/604 |
| 4,307,125 | 12/1981 | Amer ........................... 426/604 |

Primary Examiner—Steven L. Weinstein
Attorney, Agent, or Firm—Fay & Sharpe

[57] ABSTRACT

Margarine or other foodstuff with similar physical properties is warmed to room temperature and placed in a mixing bowl (10). The margarine is blended by stirring with paddles (12). Then, the margarine is mixed until it has a substantially uniform viscosity by a recirculating pump (14), extrusion of the margarine from the recirculating pump through a screen (16), and continued stirring with the paddles. A 15 to 30 second burst of steam is applied into jacket (20) liquifying but not clarifying the margarine contiguous with the edge of the vessel. The recirculating pump draws the liquified margarine from the edge of the mixing bowl and pumps it into the top center of the margarine where it is blended into substantially unheated margarine. The process is repeated until the margarine attains a viscosity in the range of 16,000 to 18,000 centipoise. Once this viscosity range is reached, the margarine is pumped into a holding tank (26). A filling machine (30) draws the margarine from the holding tank and pumps metered volumes into heat sealed squeeze packets (60).

10 Claims, 3 Drawing Figures

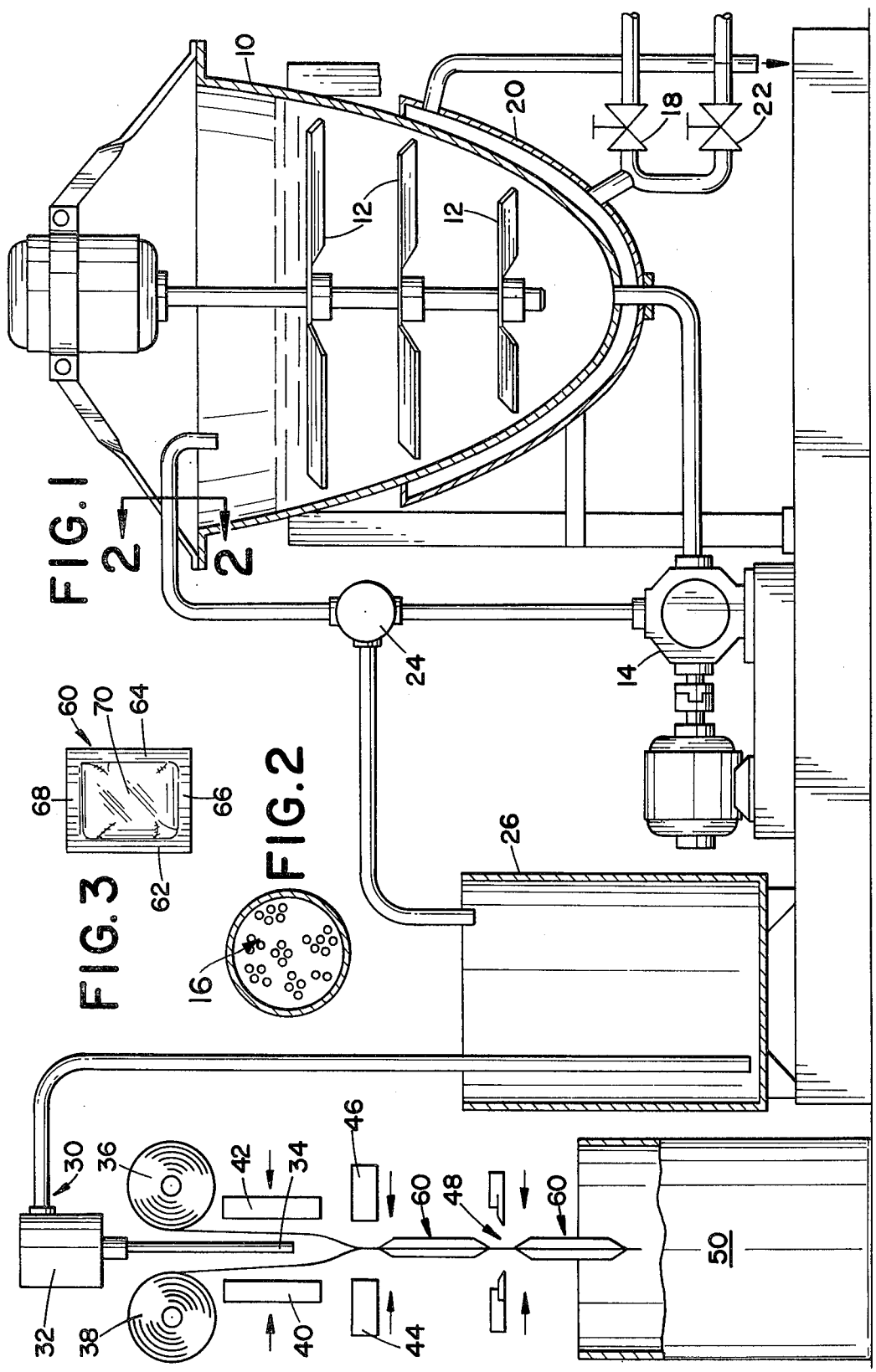

METHOD OF PROCESSING MARGARINE OR BUTTER FOR SQUEEZE PACKET CONTAINERS

BACKGROUND OF THE INVENTION

This application is a continuation-in-part of application Ser. No. 423,063, filed Sept. 24, 1982, now abandoned.

The present invention pertains to the art of food processing and more particularly to the preparation of foodstuffs for filling squeeze packets. The invention finds particular application in the production of margarine filled squeeze packets and will be described with particular reference thereto. It is to be appreciated, however, that the invention is also applicable to filling squeeze packets with other foodstuffs which undergo a controllable phase change between crystaline and non-crystaline states, such as butter, peanut butter, processed cheese spreads, and the like.

Heretofore various condiments such as mayonnaise, mustard, honey, relish, and others have been available in single serving squeeze packets for direct spreading on foodstuffs. The squeeze packets are commonly structured of two rectangular sheets of flexible plastic material, generally about an inch to an inch and a half by three or four inches, which are heat sealed around their periphery to define a condiment holding pocket. Margarine is conspicuously absent from the selection of condiments available in squeeze packets.

Individual servings of margarine are commonly available, but not in squeeze packets. Rather, slices or patties of margarine are normally individually paper or foil wrapped, packaged in stiff plastic containers with peel-off tops, or the like and which require a knife for spreading the contents. These packaging techniques have been dictated by the physical properties of margarine. That is, margarine, like butter, is relatively hard or stiff in its normal, crystaline state. Although it is recognized that margarine can be made liquid by increasing the temperature, it is generally considered undesirable to do so. Elevated temperatures permanently alter the physical properties of margarine. Specifically, margarine is an emulsion which breaksdown or becomes clarified at elevated temperatures. Once the emulsion is broken, the margarine will not set or recrystalize into the same physical structure. Rather, it will have a different color, texture, consistancy, and the like creating a different appearance and flavor. Accordingly, margarine is commonly placed in individual packages at cold temperatures by slicing the crystalized product or extruding the cold margarine under high pressures. Individual butter servings have heretofore been processed and packaged in essentially the same manner as margarine.

The prior art individual serving margarine and butter packages have been relatively expensive and are relatively easily damaged in handling and shipment. The packaging machines for producing the prior art margarine individual serving packages tend to run relatively slowly and the packaging operation tends to be relatively labor intensive.

At room temperature, margarine is too stiff or viscous to be packaged in squeeze packets. To the extent that the squeeze packet filling machinery would operate, it would run relatively slowly and would tend to discharge erratic filling portions. The filling machinery would tend to make an incomplete discharge of the viscous materials, creating squeeze packets which were short-weighted. Heating margarine would not only create the product degradation problems discussed above, but would also create problems in squeeze packet filling. Margarine heated to a low viscosity would splash entering the squeeze packet. The splashed margarine would interfer with the heat sealing of the packet and create a leaky packet.

The present invention provides a new and improved processing method which overcomes the above referenced problems and others to provide for the production of margarine and like foodstuff filled squeeze packets.

SUMMARY OF THE INVENTION

In accordance with the present invention, there is provided a method of processing foodstuffs that comprise in primary part an emulsion of at least fatty oils and water which is substantially solid at room temperature, which has a reduced viscosity above room temperature, and which separates into its oil and water components at a separation temperature. The viscosity of the foodstuff is adjusted to a viscosity in the range of 16,000 to 18,000 centipoise. The viscosity adjusted foodstuff is pumped in metered amounts into flexible squeeze packets. The squeeze packets are heat sealed.

In accordance with a more limited aspect of the invention, the foodstuff is margarine.

In accordance with another more limited aspect of the invention, the margarine is mixed during the viscosity adjustment by both stirring and by recirculating the margarine with a pump.

In accordance with yet another more limited aspect of the invention, the viscosity is adjusted by heating limited portions of the margarine, preferrably around its periphery, with short bursts of steam. The recirculating pump blends the margarine melted by the steam heat into the remaining margarine lowering the overall viscosity.

A primary advantage of the present invention is that it enables squeeze packets to be filed with margarine, butter, and other like foodstuff.

Another advantage of the present invention is that it packages margarine and butter relatively quickly and inexpensively.

Yet another advantage of the present invention is that it enables butter and margarine to be packaged in relatively durable and easily handled individual serving packets.

Still further advantages of the present invention will become apparent to others upon reading and understanding the following detailed description of the preferred embodiment.

BRIEF DESCRIPTION OF THE DRAWINGS

The invention may take form in various steps and arrangements of steps or may be accomplished with various parts and arrangements of parts. The drawings are only for the purpose of illustrating a preferred embodiment of the present invention and are not to be construed as limiting it.

FIG. 1 is a diagramatic illustration of processing equipment for processing margarine and other foodstuffs in accordance with the present invention;

FIG. 2 is a view through section 2—2 of FIG. 1; and,

FIG. 3 is a plan view of a heat sealed squeeze packet.

DETAILED DESCRIPTION OF THE PREFERRED EMBODIMENT

Margarine and butter are emulsions of fat or oil, water, solids, and often salt. In butter, the emulsion is solid or crystalized at room temperature and below. At a temperature below normal body temperature, the emulsion breaksdown or separates releasing the fat or oil component to provide the recognizable butter taste. Although the exact emulsion and properties in margarine may vary, the margarine emulsion is commonly selected to have similar characteristics to the butter emulsion.

Referring now to the preferred embodiment, blocks of margarine, commonly on the order of 50 pounds apiece, are warmed from a refrigerated temperature to room temperature. Room temperature is considered herein to be 65° F. to 85° F. with 75° F. being preferred. The margarine is brought slowly to room temperature by standing in room temperature air until it is room temperature throughout, generally about 24 hours.

With reference to FIG. 1, the room temperature margarine is pushed into the bottom of a mixing bowl 10. A mixing head with appending paddles 12 is placed in the mixing bowl with the margarine and the paddles rotate slowly. The paddles continue turning until the blocks of margarine are broken up and have a generally uniform, but relatively high viscosity.

With continuing reference to FIG. 1 and further reference to FIG. 2, once the margarine is relatively uniform, a pump 14 starts drawing the margarine from the bottom end of the mixing bowl and recirculating it back to the top end of the mixing bowl. A flow divider 16 divides the flow of margarine as it is recirculated by the pump. In the preferred embodiment, the flow divider is a stainless steel screen, more specifically a plate having a plurality of closely spaced ⅛ inch diameter apertures. The solid portions of the stainless steel screen restrict the flow path causing the margarine flow to be accelerated as it is pumped through the screen apertures. After passing the restriction, the margarine flows slow down. The slowing of the margarine flows introduces radial flow components causing the flows to blend. In this manner, the screen and pump function as an extruder to expedite breakup of the margarine lumps and shorten processing time. The pump and stirring paddles coact to mix the margarine. The mixing step continues with the pump and paddles until the margarine is smooth and of substantially uniform viscosity, commonly about 28,000 centipoise.

Referring again to FIG. 1, once the margarine is smooth, the viscosity is adjusted to bring it into the range of 16,000 to 18,000 centipoise. In the step of adjusting the viscosity, the viscosity is temporary and reversible such that the margarine will return to its normal, high viscosity solid state before it is made available to the consumer. The viscosity is adjusted by opening a steam valve 18 or other appropriate control to introduce a burst of steam or other high temperature fluid into a jacket 20 surrounding at least the lower portion of the mixing bowl. The steam is supplied for a short duration, on the order of 15 to 30 seconds. The duration is selected such that the margarine forms a thin layer of liquid around the edge of the bowl but not a duration sufficient for the margarine around the edge of the bowl to clarify, i.e. irreversibly breakdown the emulsion. The heating duration is short compared with speed at which the margarine transfers heat, such that only margarine contiguous to the bowl is heated. Margarine near the center of the bowl is not heated directly.

The pump quickly draws off the low viscosity liquid margarine adjacent the surface of the mixing bowl and pumps it to the top central portion of the margarine. The low viscosity liquified margarine and the higher viscosity margarine in the center of the bowl are mixed by the pumping action and the stirring of the paddles 12. The higher viscosity margarine absorbs heat from the liquid margarine and the margarine as a whole becomes less viscous. Because margarine retains the low viscosity for an extended period before setting or recrystalizing, the reduction in viscosity does not require a corresponding, similtaneous increase in the temperature of the entire mass of margarine. After the steam or other heating medium is circulated through the jacket 20, a cooling fluid, such as 35° F. to 55° F. water, is released by a valve 22 or other control means to flow through the jacket 20. This removes heat from the mixing bowl before sufficient heat is transferred to the margarine to clarify it or otherwise destroy the emulsion. This closely controls the amount of heat transferred to the margarine by terminating the transfer of heat promptly. The viscosity is then checked to ascertain whether or not the 16,000 to 18,000 centipoise range has been attained. If it has not, the steam valve is opened for a like short duration heating the jacket 20 and the periphery of the margarine. The burst of steam is again followed by cooling water to prevent overheating. Bursts of steam are provided repetitively until the 16,000 to 18,000 centipoise viscosity range is attained.

If portions of the margarine are heated sufficiently to be clarified upon setting or recrystalizing, the clarified margarine will not return to the original physical form. However, only a relatively small portion of the margarine is liquified by each burst of steam and the small liquified portion is distributed uniformly throughout the margarine. Accordingly, if a portion of the liquified margarine portion should be clarified during the heating process, it is distributed throughout the margarine sufficiently dilutely that the margarine recrystalizes without a noticeable degradation in quality.

After the margarine has attained a viscosity in the range of 16,000 to 18,000 centipoise, a diverter valve or other margarine flow control means 24 diverts the margarine from the pump 14 to a holding tank 26. It is a physical characteristic of margarine, that upon attaining the 16,000 to 18,000 centipoise viscosity at 75° F., it will substantially hold that viscosity for about half an hour. The holding tank holds the viscosity adjusted margarine while a filling apparatus 30 fills squeeze packets with it. While the margarine in the holding tank is being used to fill packets, another batch of margarine may be processed in the mixing tank 10. In this manner, substantially continuous production is attained.

Briefly stated, the filling apparatus includes a positive displacement or slug pump 32 which pumps metered volumes of the margarine into each of a plurality of feed tubes 34. Rolls of plastic material 36 and 38 feed a flat sheet of plastic material to either side of the feed tubes 34. Heating means 40 and 42 come together in coordination to heat seal vertical edges of the plastic material from the rolls forming a tubular length around each of the feed tubes 34. Vertical splitting means, not shown, split the vertical heat seals centrally. Transverse heat sealing means 44 and 46 periodically close on the tubular structure to divide it into pockets. Specifically, three sides of a pocket are formed by the heating means 40, 42, 44, and 46. Then the slug pump 32 pumps a metered amount of margarine into the pocket. The flexible sheet material is advanced a preselected unit length and the vertical edge and transverse sealing means are again brought together to close the top of the first pocket, form the sides of a second pocket, and close the bottom of the second pocket. This second pocket is then filled with margarine and the processed repeated cyclically. A cut off blade 48 cyclically severs the transverse heat seals to divide the packets into individual serving squeeze packets. The individual packets are then collected in a container 50 such as a packaging box or the like.

With reference to FIG. 3, a squeeze packet 60 has a pair of side heat sealed vertical edge areas 64 and upper and lower heat sealed areas 66 and 68. These heat sealed areas completely surround the periphery of the squeeze packet to define a margarine holding pocket 70 therein. With time, the margarine in the packets sets or recrystalizes into the consistency which the consuming public normally associates with margarine. This consistancy, of course, varies with the temperature of the margarine—relatively stiff at cold temperatures and less viscous at elevated temperatures.

Although a specific method for adjusting the viscosity has been illustrated in the preferred embodiment, it is to be appreciated, that other methods are contemplated for bringing the viscosity of the margarine to the 16,000 to 18,000 centipoise range without clarifying the margarine. One alterate method for adjusting the viscosity is to feed the margarine through an extruder with a heated barrel. In this manner, the margarine along the surface of the barrel is heated and blended into the remaining margarine by an extrusion auger. Other techniques which lower the viscosity of a portion of the margarine below the 16,000 to 18,000 centipoise range and then blend it with margarine at above the range to produce a mass of margarine in the 16,000 to 18,000 centipoise range are also contemplated.

The invention has been described with reference to the preferred embodiment. Obviously, modifications and alterations will occur to others upon reading and understanding the preceding detailed description of the preferred embodiment. It is intended that the invention be construed as including all such alterations and modifications insofar as they come within the scope of the appended claims or the equivalents thereof.

Having thus described the preferred embodiment the invention is now claimed to be:

1. A method of processing a normally non-flowable margarine or butter product comprising:
   (a) mixing said product to a uniform viscosity in a mixing bowl by stirring the product;
   (b) heating the mixing bowl to form a thin layer of low viscosity liquid product around the edge of the mixing bowl, said heat being applied to the mixing bowl at a temperature and of short duration such that the liquid product around the edge of the mixing bowl does not undergo irreversible breakdown of its emulsion and such that only the product contiguous with the bowl is directly heated;
   (c) recirculating a portion of the product including the low viscosity liquid product through an additional mixing means and back to the mixing bowl;
   (d) repeating steps (a) through (c) until the overall product viscosity is lowered to the range of 16,000 to 18,000 centipoise at 75° F.;
   (e) pumping the 16,000 to 18,000 centipoise viscosity product into flexible squeeze packets; and,
   (f) sealing the squeeze packets forming closed, flexible containers holding the product.

2. The method as set forth in claim 1 further including the step of allowing the product to rest in a holding tank subsequent to the step of adjusting its viscosity and prior to the step of pumping it into the squeeze packets.

3. The method as set forth in claim 1 wherein the product is margarine.

4. The method as set forth in claim 1 wherein the product is butter.

5. The method as set forth in claim 1, wherein the step of heating the mixing bowl includes steam heating the mixing bowl.

6. The method as set forth in claim 5 further including cooling the mixing bowl following the steam heating step to control the amount of heat transferred to the product.

7. The method as set forth in claim 6 wherein the steam heating step is carried out for 10 to 30 seconds and the cooling step includes circulating 35°–50° F. water.

8. The method as set forth in claim 1, wherein said step of recirculating a portion of the product through an additional mixing means includes dividing said portion of the product into a plurality of flows.

9. The method as set forth in claim 8 wherein the step of dividing the portion of the product includes accelerating the plurality of flows and further including decelerating and recombining the plurality of flows.

10. The method as set forth in claim 8 wherein the dividing step includes extruding the product through a plurality of apertures and further including recombining the extruded product.

* * * * *